United States Patent
Oehrke et al.

(10) Patent No.: US 7,047,300 B1
(45) Date of Patent: May 16, 2006

(54) SURVIVABLE AND SCALABLE DATA SYSTEM AND METHOD FOR COMPUTER NETWORKS

(75) Inventors: Terry Lee Oehrke, Lee's Summit, MO (US); Michael Allen O'Brien, Olathe, KS (US); Scott Christopher Wells, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 387 days.

(21) Appl. No.: 09/021,466

(22) Filed: Feb. 10, 1998

(51) Int. Cl.
*G06F 15/173* (2006.01)
(52) U.S. Cl. ...................... 709/226; 709/229
(58) Field of Classification Search ................ 709/224, 709/213, 214, 215, 208; 711/129, 153
See application file for complete search history.

(56) References Cited

U.S. PATENT DOCUMENTS

| | | | |
|---|---|---|---|
| 4,914,570 A * | 4/1990 | Peacock ..................... 364/200 |
| 5,555,371 A | 9/1996 | Duyanovich et al. |
| 5,610,841 A * | 3/1997 | Tanaka et al. .............. 725/115 |
| 5,613,106 A | 3/1997 | Thurman et al. |
| 5,689,706 A | 11/1997 | Rao et al. |
| 5,699,503 A * | 12/1997 | Bolosky et al. ........ 395/182.04 |
| 5,713,017 A | 1/1998 | Lin et al. |
| 5,745,753 A | 4/1998 | Mosher, Jr. |
| 5,751,955 A * | 5/1998 | Sonnier et al. ........ 395/200.19 |
| 5,765,171 A | 6/1998 | Gehani et al. |
| 5,781,550 A | 7/1998 | Templin et al. |
| 5,781,912 A | 7/1998 | Demers et al. |
| 5,794,253 A | 8/1998 | Norin et al. |
| 5,815,668 A | 9/1998 | Hashimoto |
| 5,838,894 A * | 11/1998 | Horst .................... 395/182.09 |
| 5,852,724 A * | 12/1998 | Glenn, II et al. ....... 395/200.69 |
| 5,867,667 A | 2/1999 | Butman et al. |
| 5,870,552 A | 2/1999 | Dozier et al. |
| 5,870,558 A | 2/1999 | Branton, Jr. et al. |
| 5,894,554 A | 4/1999 | Lowery et al. |
| 5,948,108 A * | 9/1999 | Lu et al. ....................... 714/4 |
| 5,950,198 A | 9/1999 | Falls et al. |
| 5,974,563 A | 10/1999 | Beeler, Jr. |

(Continued)

OTHER PUBLICATIONS

Veritas Software Corporation, "Veritas Storage Replicator for File Systems—White Paper," (Feb. 2, 1998).

(Continued)

*Primary Examiner*—Dung Dinh (57) ABSTRACT

A fully scalable and survivable network architecture and method is disclosed. In particular, a system for providing network or intranet processing and stored data access and an associated method is provided. The system includes a plurality of sets of at least first and second application processors. Each of the first and second processors within a set apply substantially the same application. One or more switches operatively connect to at least the first and second processors and a plurality of data storage devices. The data stored in the data storage device is associated with the application and mirrored, and at least the first and second processors operate at substantially the same time to obtain data. Both sources of mirrored data are operational at the same time to output data.

8 Claims, 6 Drawing Sheets

U.S. PATENT DOCUMENTS

| | | |
|---|---|---|
| 5,982,891 A | 11/1999 | Ginter et al. |
| 6,026,433 A | 2/2000 | D'Arlach et al. |
| 6,055,522 A | 4/2000 | Krishna et al. |
| 6,092,086 A | 7/2000 | Martin et al. |
| 6,112,239 A * | 8/2000 | Kenner et al. ............... 709/224 |
| 6,125,388 A | 9/2000 | Reisman |
| 6,134,584 A | 10/2000 | Chang et al. |
| 6,144,999 A | 11/2000 | Khalidi et al. |
| 6,199,082 B1 | 3/2001 | Ferrel et al. |
| 6,202,093 B1 | 3/2001 | Bolam et al. |
| 6,208,986 B1 | 3/2001 | Schneck et al. |
| 6,266,694 B1 * | 7/2001 | Duguy et al. ............... 709/223 |

OTHER PUBLICATIONS

Rdist Main Page, http://www.arachna.com/webservers/rdist_man.html (No Date).

Getting Started with PC—Rdist, http://www.pyzzo.com/pcrdist/1x/docs/start.shtml (No Date).

U.S. Appl. No. 09/160,389, filed Sep. 25, 1998, Helmer et al.

U.S. Appl. No. 09/160,424, filed Sep. 25, 1998, Schneebeli et al.

* cited by examiner

SURVIVABLE AND SCALABLE DATA SYSTEM AND METHOD FOR COMPUTER NETWORKS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

This invention generally relates to computer networks. In particular, the invention relates to Internet and intranet computer systems.

2. Description of the Prior Art

The Internet is an international network of interconnected government, education, and business computer networks. A person at a computer terminal or personal computer with the proper software communicates through the Internet by placing data in an Internet protocol (IP) packet with an address for a particular destination on the Internet. Using Transmission Control Protocol (TCP), transport of the packet is managed. Communication software on processors or routers on the intervening networks between the source (the users network) and the destination network read the address assigned to the packet and forward the packets towards their destination.

Intranets are typically corporate networks that use the same networking or transport protocols as the Internet. Typically, dedicated servers provide access to corporate information in a cohesive fashion. For example, documents are stored in a HyperText Markup Language (HTML), and users of the intranet network use web browser software to obtain access to the documents. Thus, both the Internet and intranets can be IP networks.

IP network access allows a user to gain access to various applications and related data. For example, a user with web browser software enters an address of a desired application. The address and the users request for access is then routed through the IP network or a plurality of IP networks to a server or processor at the requested address. Access is thus gained to the application. The user may then request further information such as an HTML document or further processing associated with the application. Using HyperText Transport Protocol (HTTP), HTML documents are communicated to the user.

Various groups provide the servers and associated applications. For example, a corporation provides a content server for access to information about that corporation by users through the IP network. Multiple servers, each geographically remote to the other, may run the same applications for more efficient data retrieval.

Typically, any given server is dedicated to a finite number of groups or companies and includes a dedicated data storage source. For reliability, a second server or processor and a mirrored data source are held in standby and cross connected to the operational server and data storage source. One data storage source provides output data and receives input data. The other data storage source receives input to maintain a mirror image of the fully operational data source. If the operational data source crashes, the second data source becomes operational. Likewise, if the operational server crashes, the second server becomes operational.

The above described redundancy is an inefficient and expensive method to provide survivability. Furthermore, adding additional server or data storage source capabilities may require unacceptable amounts of down time during upgrading.

SUMMARY OF THE INVENTION

The present invention is directed to a fully scalable and survivable network architecture and method. According to one feature of the invention, redundant front end processors (FEP) are implemented for each service offered by the data center to provide survivability to the data center. According to a second feature, data servers are separated from the front end processors to provide scalability. A switching device provides a connection between the front end processors and the data servers. Advantageously, an architecture according to the present invention allows for complete horizontal and vertical scalability of the data center. Additional FEPs may be added to address additional demand for a particular service or for additional services. Additional data storage capacity may be added independently. An architecture according to the present invention also provides complete fault tolerance. The combination of redundant application processors connected to separate data servers enables the system to remain fully operational when any single network component fails. Since the various FEPs and data storage devices operate at the same time, the redundancy is used efficiently.

In a particular first aspect of the invention, a system for providing network processing and stored data access and an associated method is provided. The system includes at least first and second application processors. Each of the first and second application processors apply substantially the same application. A switch operatively connects to at least the first and second processors. A data storage device operatively connects to the switch. The data stored in the data storage device is associated with the application, and at least the first and second processors operate at substantially the same time.

In a second aspect of the invention, there are at least two sets of application processors, where each set applies the same application. There are at least two switches and at least two data storage devices. The data stored in the data storage devices is associated with the application of at least one set of front end processors. At least two application processors of at least one set operates at substantially the same time.

In a third aspect of the invention, the system includes at least a first application processor applying an application. A switch operatively connects to the first application processor. At least a first and second source of stored data operatively connects to the switch and contain mirrored data. The first and second source of stored data provide output data at substantially the same time to the first application processor for the application.

In a fourth aspect of the invention, a method for providing network processing and stored data access includes receiving at least first and second user requests at a first application processor; applying an application in response to the first and second requests with the first application processor; generating first and second queries for stored data in response to applying the application to the first and second requests, respectively; switching the first and second queries to at least a first and second source of mirrored and stored data, respectively; and providing first and second output data at substantially a same time in response to the first and second queries, respectively, from the first and second sources, respectively, to the application processor.

DETAILED DESCRIPTION OF PREFERRED EMBODIMENTS

Figure 1:
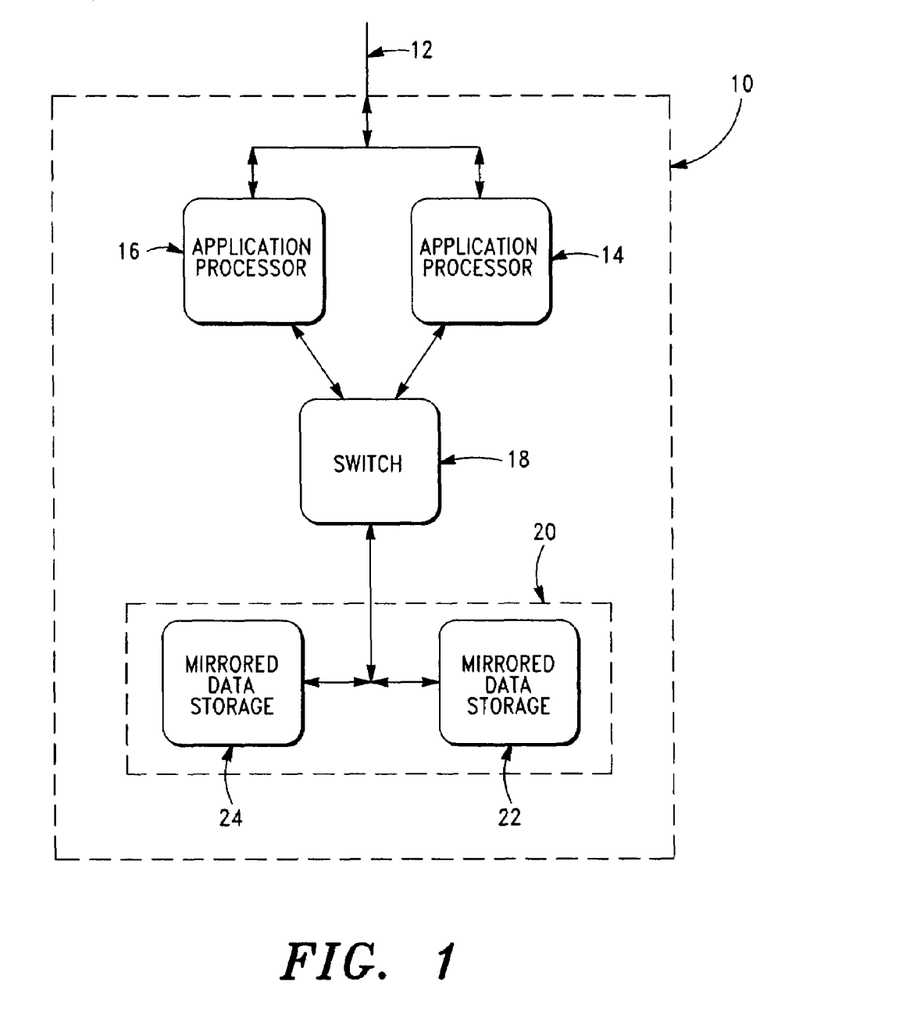
FIG. 1 is a schematic block diagram of one embodiment of a processing and data storage architecture in accordance with the present invention.
Figure 2:
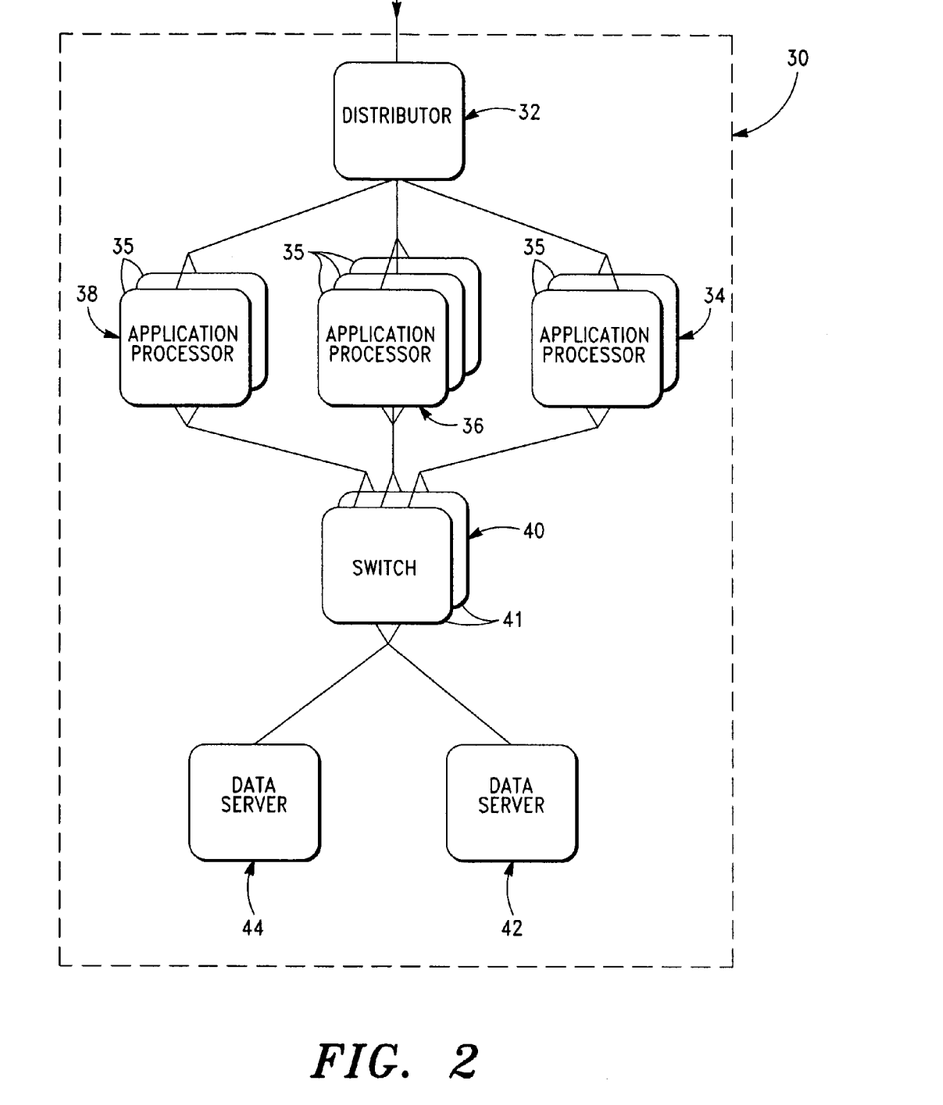
FIG. 2 is a schematic block diagram of one embodiment of a processing and data storage architecture in accordance with the present invention.
Figure 3:
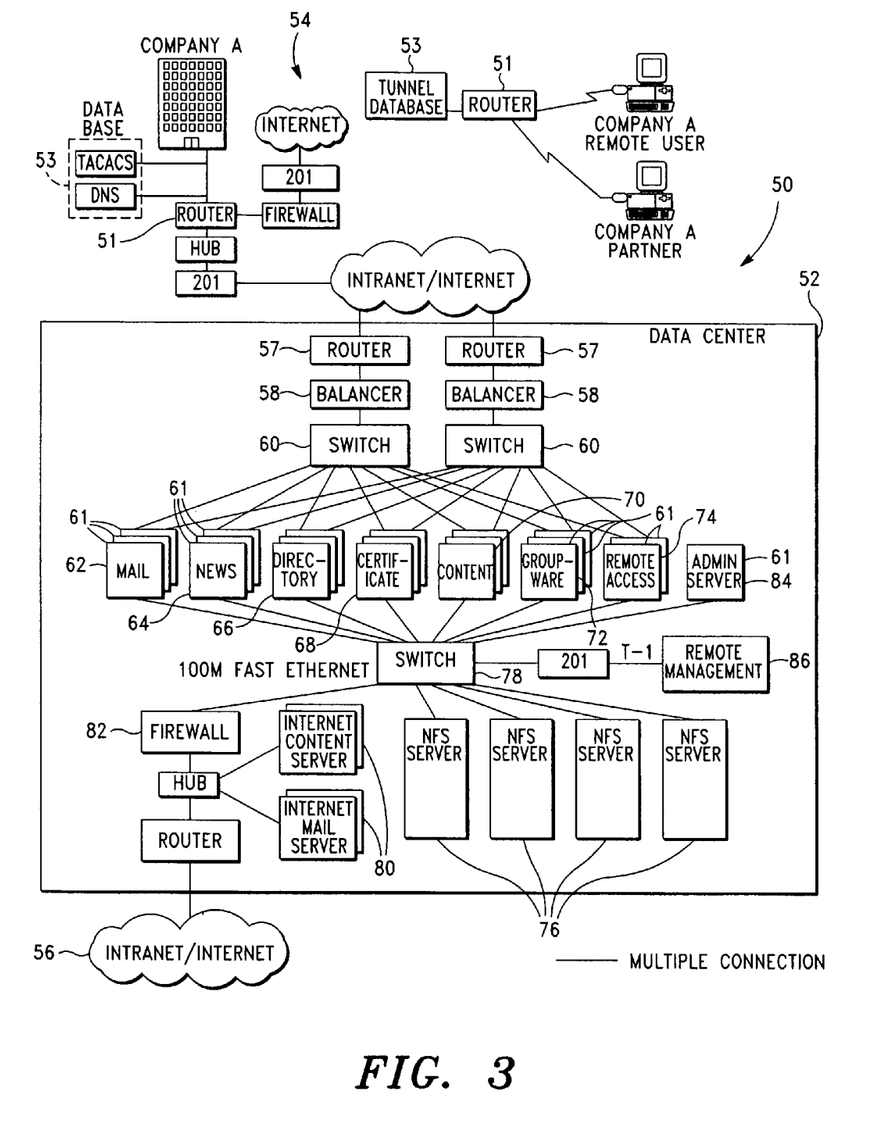
FIG. 3 is a schematic block diagram of one embodiment of a processing and data storage architecture in accordance with the present invention.

Referring to FIGS. 1–3, networks with vertical and horizontal survivability and scalability are shown. If one component, such as an application processor or a data storage device, ceases operation, a repetitive component continues the service uninterrupted (horizontal survivability). If a data storage device or an application processor ceases operation, the application processors or storage devices, respectively, continue operation (vertical survivability). The requirements of survivability are used efficiently by using the duplicative components even when no other device has failed. Preferably, none of the components are dedicated to particular users or customers for further efficiency.

To add or remove processing or storage availability or capability, one or more application processors or storage devices, respectively, are added. For example, an additional owner or customer is provided with mail processing. If the current mail application processors are at or near capacity, an additional mail application processor is added (horizontal scalability). The load balancers or routers are configured to balance requests across the current and new mail application processors. If the current data storage devices are at or near capacity and the additional user requires data storage, then a new source of data is added, such as a new hard drive or a new cabinet. Thus, the processing and data storage capabilities are scaled independent of each other (vertical scalability).

Referring now to FIG. 1, a schematic depiction of one embodiment of a server and data storage architecture is shown generally at 10. Through an intranet or Internet or other network connection, a user request is routed to architecture 10 on line 12. For example, a TCP/IP request is routed to architecture 10. Architecture 10 generates a response to the request and places the response on line 12 for routing back to the user. Thus, architecture 10 represents a data center. The various components described below of architecture 10 are preferably located proximate to each other, but may be dispersed in various geographical regions.

Architecture 10 as shown comprises two application processors 14 and 16, a switch 18 and data storage 20. The application processors or front end processors 14, 16 preferably comprise servers as known in the art, such as SUN SPARC computer processors each associated with a unique network address. Each application processor 14, 16 runs at least one of the same applications as the other. In a preferred embodiment, each application processor 14, 16 is dedicated to a particular application. The application may include any known service, such as, for example, mail, news, directory, content, or groupware applications. Groupware applications include any type of collaborative tool, such as video conferencing and whiteboard software. For example, both application processors 14, 16 run a news application. The news application may include processing associated with bulletin boards of current events and chat rooms, as known in the art.

The application, such as a news application, of each application processor 14, 16 is dedicated to one or more customers. For example, five different news organizations or customers provide news information in one or more formats for access by various users. The users may be members of the customers or unrelated to the customers. As another example, different groups within a corporation post news information for use in the corporation's intranet environment.

At any given time, one or more requests on line 12 are routed to one of application processors 14, 16. For example, the routing may be performed in accordance with the system and method disclosed in U.S. patent application Ser. No. 09/021,091 for a Method And System For Network Routing, filed herewith. Application processor 14 receives one or more requests related to a customer and application processor 16 also receives one or more requests related to the same customer. For example, at least one request for news information is routed to application processor 14, and a similar request for the same news information is routed to application processor 16.

Each application processor 14, 16 applies application software to the requests. In response, queries for information are generated by application processors 14 and 16. For example, the requests correspond to a recent news article and application processors 14, 16 generate queries to obtain the news article. The queries are in any of various formats, such as Simple Mail Transfer Protocol (SMTP), Network News Transfer Protocol (NNTP), HyperText Transfer Protocol (HTTP), Calendar Access Protocol (CAP), File Transfer Protocol (FTP), and Lightweight Directory Access Protocol (LDAP). Other TCP/IP formats or other protocols may be used.

The queries are output on a connection between application processors 14, 16 and switch 18. Preferably, duplicative connections are provided. One connection is used and the other is a redundant backup, but both may be used simultaneously. Application processors 14, 16, switch 18 and data storage 20 each includes an interface for each connection. The interface formats the query for transport to another interface, such as transporting the queries from the application processors 14 and 16 to the switch 18. Various transport formats, such as asynchronous transfer mode (ATM), Fiber Distributed Data Interface, or fast switched Ethernet formats, may be used. Preferably, on ATM transport format is used.

Switch 18 receives the queries. Switch 18 is constructed as known in the art and operates under the control of any of various software applications, such as Catalyst 5000 switch by CISCO. Switch 18 acts to separate front end processing of application processors 14, 16 from data storage 20 for vertical scalability and survivability. Switch 18 passes the queries over a connection and corresponding interface card, such as one of at least two preferably duplicative connections, to the storage device 20.

Data storage 20 is of a construction as known in the art, such as one or more hard disk drives and associated processors. For example, data storage 20 may include a device configured for the Network File System (NFS) standard. Preferably, data stored on data storage 20 is mirrored, as represented by mirrored data storage 22 and 24. Mirrored data storage 22 and 24 may represent different locations on a drive, different drives or different cabinets. Preferably, each mirrored data storage 22, 24 is in a different cabinet or NFS server than the other. Any changes to the data stored in one of mirrored data storage 22 and 24 is also made in the other. Thus, identical or substantially the same data is provided in two locations.

Data in data storage 20 corresponds to one or more applications and the associated one or more customers or owners of the applications. For example, one of the customers or owners of the news application has the requested news article stored in data storage 20. For storage devices 20 with more than one drive and associated processor, switch 18 directs each query to a designated (prime) drive and processor for the associated application and/or customer/owner. Data storage 20 receives the queries from application processors 14, 16, such as the query being routed to the prime mirrored data storage 22 or 24. The processor or processors of data storage 20 obtain responsive information to the query from either mirrored data storage device 22, 24. For example, a query from application processor 14 for the news article is directed to mirror data storage 22, and the query from application processor 16 for the same news article may be directed to mirror data storage 24, depending on various factors, such as the customer/owner. For the same customer/owner, the processor associated with prime mirrored data storage 22 or 24 may reassign one or more queries to the other mirrored data storage 22 or 24. The reassignment may be based on various factors, such as comparative or non-comparative load balance, CPU and/or I/O usage factors. The news article is output in an HTML format or other formats to the appropriate application processor 14, 16 via connections and switch 18 by the respective mirrored data storage 22 and 24.

By providing more than one application processor 14 or 16 applying the same application horizontal scaling and survivability is provided, as discussed below. By providing data storage separated from the front end processing, vertical scalability and survivability is provided, as discussed below.

Referring now to FIG. 2, various features are added to architecture 10 of FIG. 1. These features provide more comprehensive service and better survivability. Preferably, all the connections between the various components in architecture 36 are duplicative Ethernet connections encrypted in a Level 2 Forwarding (L2F) format. Other connections and formats, such as Level 2 Transfer Protocol or Point-to-Point Tunneling Protocol, may be used.

Requests are input to one or more distributors or load balancers 32. Distributor 32 is a router or other computer processor, as known in the art. For example, distributor 32 runs Cisco's Local Director software or operates as a local redirector as discussed in U.S. patent application Ser. No. 09/021,091 for a Method And System For Network Redirecting, filed herewith. Distributor 32 distributes each request to a particular set 34, 36 and 38 of application processors 35. More or fewer sets 34, 36 and 38 of application processors 35 may be provided. Furthermore, one or more sets 34, 36, 38 may include only one application processor.

Each set 34, 36 and 38 of application processors 35 applies a different application. For example, the application processors 35 in set 34 apply a mail application, the application processors 35 in set 36 apply a directory application, and the application processors 35 in set 38 apply a news application. Each of the application processors within the set preferably applies the same application. For example, each of the two application processors 35 shown in set 34 apply the same or substantially the same mail application.

Additionally, distributor 32 distributes each request to a particular application processor 35 within the set 34, 36 or 38. For example, a request to generate an electronic mail message is received by distributor 32. Within each set more or fewer, but preferably at least two, application processors 35 may be used. In the example of the e-mail request discussed above, distributor 32 selects the mail application processor set 34 to receive the request. The distributor 32 selects one of the two or more application processors 35 within the set 34 for receipt of the request.

The selection of the application processor 35 within set 34, 36 or 38, is preferably based on various balancing factors. The factors include the number of requests distributed to each particular application processor 35 within a certain amount of time and whether that particular application processor 35 is currently operational. Thus, the current bandwidth of an operational application processor 35 is used for load balancing. Different, fewer, or additional factors may be used, such as information on the application processors current CPU utilization, data storage input/output utilization, and the usage rate of the network interface. Preferably, Simple Network Management Protocol Management Information Base is used to collect the factors. For a discussion of various load balancing factors and distribution, refer to U.S. patent application Ser. No. 09/021,091 for a Method And System For Network Redirecting, filed herewith.

As discussed above each application processor is dedicated to one or more, such as 35, customers or owners. One or more customers or owners provide the application to any of various users. The customers are customers from the stand point of an owner of architecture 30. For example, Sprint® owns and operates the architecture 30. Customer, Company A, pays Sprint® to provide Company A application or data services to various users (such as employees or network users). As another example, Sprint®, the owner, provides Sprint® application or data services for users (such as employees or other network users).

Each application processor 35 and each set 34, 36 and 38 processes any number of various requests as discussed above. Application processors 35 may generate queries. The queries are transferred through a set of switches 40 to another set of application processors 34, 36, 38 or data servers 42 and 44. For example, one of the mail application processors 35 in set 34 generates a query to set 36 of directory application processors 35. The query is routed through distributor 32 to set 36. Distributor 32 processes the query as a request (as discussed above). Alternatively, the query may be routed through switch 40. For example, the query is for a list of individuals within a company. One of directory application processors 35 in set 36 receives the query and applies the directory application to generate a query for the current directory list. This query and other queries are directed to data servers 42 and 44 as discussed above.

Set 40 of switches 41 receives the various queries. Set 40 of switches 41 preferably comprises two switches 41, but more or fewer switches 41 may be used. If one switch 41 is not operational, the other switch 41 continues to transfer queries. The queries are routed to the data servers 42, 44 or other application processors 35 using software as discussed above. For example, the query for a directory list is routed to one of the data servers 42 and 44.

Each data server 42 and 44 represents one or more NFS servers. Other formats may be used. Each of these data servers 42 and 44 is a source of data. Preferably, data server 42 is a mirrored data source of data server 44. Alternatively, mirrored drives within each data server are used, so that only a portion or no data in data server 44 is a mirror image of the data in data server 42. The data in data servers 42 and 44 corresponds to the various applications and customers or owners of the applications. For example, the query for a directory list is transferred to data server 42. Since the data is mirrored, either of the two identical or substantially identical data sources is used to provide the directory list. Both sources of mirrored data output data. Both sources may output data at substantially the same time in response to different queries for the same or different information. Thus, the data storage capabilities of both data servers 42 and 44 is used for efficient output generation.

In the above example, the directory list is transferred to querying application processor 35. In this example, the directory application processor 35 then provides the directory list to mail application processor 35 for selection of an individual on the list. Mail application processor 35 generates a query for mail address information associated with the selected individual. This query is processed in a similar manner to obtain the address data for further application by mail application processor 35.

FIG. 3 presents an alternative embodiment of a data center architecture according to the present invention. Network architecture is generally shown at 50. Network architecture 50 includes a data center 52, an intranet structure 54 and an Internet access point 56. Data center 52 provides various applications and associated data for one or more customers or owners. For example, company A may use data center 52 for its intranet network 54.

Intranet network 54 includes gateway router 51, local network data base 53 and various other components known in the art. Other network architectures may be used. The users of intranet network 54 are provided with access to the data center 52.

Users from company A may access architecture 50 through a dial or dedicated connection. For a dial connection, the users, depending on their user ID, are tunneled to company A's gateway router 51, such as on a wide area network, or tunneled directly to data center 52. The tunnel is preferably encrypted. Once the encrypted tunnel has been established, company A gateway router 51 authenticates the user ID and password with a local network data base 53, such as TACACS+, RADIUS, SOLECT, etc. managed by company A.

Based on user selections, data in a TCP/IP format or other format corresponding to a user request for application processing or other data is generated. If the request corresponds to data or applications within data center 52, the company A router 51 translates the address to route the request to the data center 52. The request may be routed to other data centers due to network congestion or network outages. Preferably, the request is routed to the nearest active data center 52. The company A router 51 uses a data base of IP addresses for access to the data center 52 as known in art.

As an alternative to the company A router 51 within the intranet system 54, a gateway router may be provided within the data center 52. In this case, the user ID and password authentication is done through an access data base, such as Solect's IAF using the front end processors and data storage devices discussed below and above. The access data base is preferably virtualized (the particular companies data segmented from other companies data), so that each company may administer their own authentication process.

Data center 52 receives the user requests from intranet network 54. Data center 52 includes redundant routers 57 connected to redundant load balancers 58. Load balancers 58 are connected to redundant switches 60. Switches 60 are connected to a plurality of front end processors or application processors 61. Application processors 61 are connected through switches 78 to a plurality of data servers 76.

Application processors 61 are arranged in sets 62, 64, 66, 68, 70, 72 and 74. Each set 61, 62, 64, 66, 68, 70, 72, 74 of application processors includes two or more application processors 61 applying the same application. In one embodiment of the present invention, set 62 of application processors 61 applies mail front end processing; set 64 applies news front end processing; set 66 applies directory front end processing; set 68 applies certificate front end processing; set 70 applies content front end processing; set 72 applies groupware front end processing; and set 74 applies access data base processing, such as Solect front end processing. Other applications may be used, and sets including only one application processor 61 may also be used. Application processors 61 are accessed as discussed below.

Routers 57, such as Cisco 7500 routers, block IP traffic or requests not addressed for the data center 52. The routers 57 also provide routing for IP traffic or responses leaving the data center 52.

Once the user is authenticated and has access to the data center 52, the request is provided to one of two load balancers 58. Load balancers 58 are processors within the data path. More or fewer load balancers 58 may be used. Load balancer 58 may redirect the user request to different application processors 61 in the same set 62, 64, 66, 68, 70, 72, 74. Based on the address of the requested application processor 61 (destination address), such as a request to establish an X.509 certificate at a particular application processor 61, and various load balancing concerns discussed above in reference to FIG. 2, an application processor 61 is selected. The selected application processor 61 may have a different address than the user request's destination address, but applies the same application. Load balancer 58 changes the destination address to correspond to the selected application processor 61 if the destination address is different.

According to one embodiment of the invention, switch 60 may be a Catalyst 5000 switch made by Cisco. Switch 60 transports the requests from the load balancer 58 to the selected applications processor 61. Preferably, two routers 57, load balancers 58 and associated switches 68 are used to provide two data paths for survivability. One data path is used as a primary path and the other is a back-up or fail over data path. Alternatively, requests are balanced between the two data paths, such as by using Boarder Gateway Protocol 4 or other network routers.

User requests are routed through a data path to one application processor 61. The applications on application processors 61 are provided for one or more customers or application owners. Preferably, each application processor

61 within a set 62, 64, 66, 68, 70, 72 and 74 is operational at substantially the same time. Each application processor 61 is operable to receive requests and generate output, so requests received at load balancer 58 may be directed to more than one application processor 61 at any given time. Thus, the requests load may be distributed among application processors 61 within sets 62, 64, 66, 68, 70, 72 and 74. For example, requests associated with a plurality of first time users accessing the data center 52 is received at substantially the same time. The requests may be from one or more different users or customers, such as company A and another company. Alternatively, the request may all be from users within company A. Load balancer 58 routes the request to one or more of the application processors 61 in set 68. Preferably, the plurality of requests are distributed across the plurality of application processors 61 in set 68. The application processors 61 apply the certificate application to each of the requests received.

Preferably, a X.509 certificate is required to access the applications within the data center 52. A certificate application allows the user to input various information to request a certificate. The corporate administrator, such as the administrator for company A, gains access to application processor 61 applying the certificate application and either authorizes or denies the user's request. If the user is authorized, the next time the user accesses data center 52, an acknowledgment is made and a certificate is generated. For example, a public key is generated to correspond with a private key associated with the work station of the particular user. The public key information is either stored with application processor 61 or in a data storage device or data server 76 as discussed below. Certificate application processor 61 may also refer to an application processor 61 in the set 66. For example, a list of authorized services available to that user is obtained using the directory application. As known in the art, if a user uses a different workstation, a different X.509 certificate must be requested to generate a different private key and public key match for security reasons. The set 68 of certificate application processors 61 and/or the set 66 of directory application processors 61 may also obtain information from data servers 76.

To obtain information from the data servers 76, queries are transferred from the application processors 61 to switches 78. Preferably, more than one switch 78 is provided for survivability. Each switch 78 is operatively connected to each of the application processors 61 and each of the data servers 76 with more than one connection and the associated more than two interfaces. Preferably, each connection is a 100 M b Fast Ethernet connection.

As discussed above, switches 78 transfer the queries to the appropriate one of data servers 76, such as NFS cabinet. Each data server 76 includes mirrored data, either of data on other data servers 76 or of data within the same data server 76. The mirrored data on one data server 76 may be mirrored in another data server 76. Alternatively, the mirrored data on one data server 76 may be mirrored in part on a second and in another part on a third data server 76. The data is associated with one or more customers. Preferably, none or little of the storage in the data servers 76 is dedicated to one customer. Thus, mirrored data associated with a plurality of customers is stored on each data server 76. Mirrored data associated with one customer may be mirrored on a different data server 76 than mirrored data associated with another customer.

To further increase efficiency of storage space and as discussed above, both or more than one source of the same mirrored data is used to respond to queries. Upon any failure of one of the sources of mirrored data, such as a data server 76 not responding within 5 milliseconds, the other source of the same mirrored data is available to respond to queries. Once the failed source of data, such as one of data servers 76, is operational, the two mirrored sources of the same data are synchronized. After synchronizing to the same clock, the sources of the same data are synchronized to verify that the data is mirrored. Thus, groups of data from the recently failed data server 76 are verified against the source of mirrored data and updated as necessary. The recently failed and now operational data server 76 or source of data is then used to respond to queries, along with the other source of the same data. For example, public key data for allowing access or a directory list of applications to make available is obtained from either source of the relevant mirrored data. If more than one query associated with the same data is generated, then the queries are transferred to the same or different mirrored sources of the same data.

To change the data in data servers 76, an administration server 84 is provided. Administration server 84 controls adding, removing and changing various front end processing and mirrored data. For example, a customer with mail and news demands for various users is added, and the associated users are allowed access to data center 52. Using administration server 84, set 62 of mail application processor 61, set 64 of news application processors 61 and any other appropriate application processors 61 are updated to process requests from users associated with the added customer or owner. Data associated with the added customer or owner is mirrored and stored on one or more of the data servers 76. Data servers 76 and the appropriate set 62, 64, 66, 68, 70, 72, and/or 74 are provided data storage address information. Thus, processing and data storage services are proved to the user associated with the customer or owner. Other controls, such as control over the switches, may also be provided through administration server 84. More than one administration server 84 may be used.

Administration server 84 may also provide data center 52 monitoring. Preferably, a separate remote management point 86 is provided. The various components of data center 52 may be monitored for operational status over a T-1 connection. Information associated with any hardware additions, deletions and reconfigurations may be provided to the appropriate components. Hardware management and/or administration of data center 52 may be through a remote access point or local to data center 52. For a data center 52 that is physically disparate (one or more components in a different location or region than one or more other components), the management and administration are near or remote from each other and/or various of the components.

As shown in FIG. 3, Internet access point 56 allows a connection between data center 52 and an Internet user. Internet requests are routed to Internet processors 80 for processing, as known in the art. Firewall 82 prevents connection from the Internet access point 56 to the remainder of the data center 52. The connection from switches 78 to firewall 82 allows the transfer of data and/or queries from switches 78 to Internet access point 56. For example, data generated with one of the content application processors 61 in set 70 is downloaded to the Internet processors 80 in a World Wide Web format. Furthermore, various contact and mail information may be communicated to or from Internet access point 56 and switches 78.

In network 50 of FIG. 3, intranet system 54 is operatively connected for access to all or most of sets 62, 64, 66, 68, 70, 72, and 74 of application processors 61 and Internet access point 56 is limited by firewall 82. As an alternative, Internet access is provided with the same level of access as intranet network 54. Thus, Internet requests are routed to one or more of load balancers 58. Other levels of access availability, restrictions and security may be provided for any IP network access. Furthermore, IP network systems with different or the same architectures may use the same data center 52.

Figure 4:
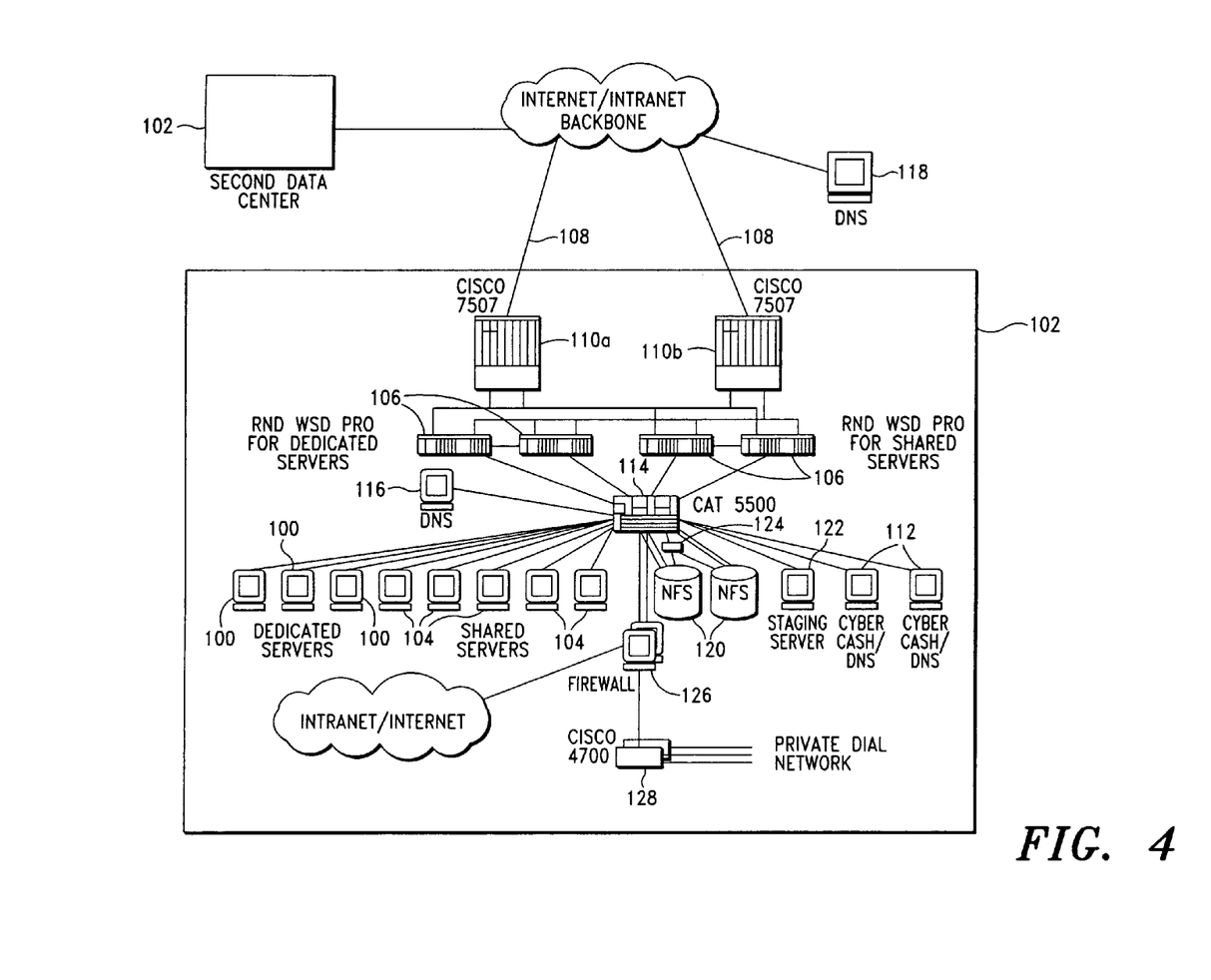
FIG. 4 is a schematic block diagram of an alternate embodiment of a processing and data storage architecture in accordance with the present invention.

Referring to FIG. 4, a preferred alternative embodiment of a data center architecture according to the present invention is shown. While only one data center 102 is shown in detail, second data center 102 preferably comprises the same components. The architecture provides a content hosting service for dedicated or shared services. Dedicated service provides a customer with a server 100 in each data center 102. Shared service places the customer application on 10 servers 104, 5 in each of two data centers 102, with RND WSD Pro boxes (load balancers) 106.

Preferably, the data center architecture provides redundant equipment setup to failover automatically in a matter of seconds. Traffic is evenly distributed, such as half and half on two connections 108 coming into data center 102. Thus, router 110a processes half the requests associated with IP addresses in data center 102 and router 10b processes the other half. Using Border Gateway Protocol, version 4 (BGP4) in the network, if one of routers 110a or 110b fail, BGP4 routes the traffic to the surviving connection 108.

Preferably, routers 110 comprise Cisco 7507 Routers (128 MB DRAM, SONET, Serial Card & Fast Ethernet Cards). Two 7507 routers 110 connect to four RND WSD Pro boxes 106. If one of the RND boxes 106 that supports the dedicated servers 100 fails, routers 110 access the redundant RND box 106 for transfers with the dedicated servers 100.

Routers 110 preferably include two router ports that support the shared servers 104. Routers 110 access a list to deny transfer of requests other than HTTP port 80 and port 443 (SSL) requests addressed to a specific range of registered IP addresses denoting shared servers 104 in data center 102. Two router ports support the dedicated servers 100. Routers 110 access a list to deny transfer of requests other than HTTP port 80, port 443 (SSL) and FTP port 20 and 21 requests addressed to a specific range of registered IP addresses denoting dedicated servers 100 in data center 102.

The RND WSD Pro boxes 106 intelligently direct IP requests to the most appropriate server 100 or 104. The method of directing is preferably fully configurable.

In this embodiment, the registered IP address of the shared and dedicated customer's sites on the appropriate server 100 or 104 resides on WSD Pro boxes 106. Each customer has two registered IP addresses, one for each data center 102. As requests enter into one of the data center WSD Pro boxes 106, the WSD Pro box 106 accesses the availability of the shared or dedicated servers 100 or 104 within that data center 102 as well as the other data center 102. If the server or servers 100 or 104 in the local data center 102 are unavailable, the request is redirected to other registered IP address at the other data center 102.

Where the customer's application is included on shared servers 104, five shared servers 104 at each data center 102 may accept any request for any shared customer site. A request may be redirected to the other data center 102 if all the shared servers 104 are down at the current data center 104.

The RND boxes 106 provide internal traffic load balancing and failover. The internal load balancing/failover feature is used for traffic being sent from the web servers 100 or 104 to the CyberCash servers 112. If one of the unregistered CyberCash servers 112 fails, RND boxes 106 route all CyberCash traffic to the surviving CyberCash server 112.

Connected to RND boxes 106 is Cisco Catalyst 5500 (Dual Power Supply, 2 Supervisor Modules, 8 Fast Ethernet Modules) switch 114. Catalyst 5500 switch 114 is a high-speed internally redundant network switch that supports virtual LANs. This network device is used to segment traffic to keep production Internet traffic from the back-end management network (e.g. back-end components and connections of servers 100, 104, 120, 122, 112). Catalyst 5500 switch 114 has redundant power supplies and redundant management modules. If either the power supply or the management module fails, the redundant device may be processing within 60 seconds. During this 60 second window, RND WSD Pro boxes 106 automatically route traffic to the other data center 102.

To provide a more redundant environment, shared servers 104 connect to separate interface cards on the Catalyst 5500 switch 114. If an interface card malfunctions, the shared pool of servers 104 are still accessible. RND WSD Pro boxes 106 automatically take servers 104 connected to the failed card out of the shared server pool. These shared servers 104 are added to the pool as soon as the card has been replaced.

Preferably, each dedicated server 100 comprises a Sun Ultra 2 server (300 Mhz, 256M Ram, two 2 GB drives and two Fast Ethernet Adapters). Each dedicated customer application has a dedicated server 100 in two data centers 102, such as a data center in San Jose and one in Relay. Each dedicated server 100 has two Fast Ethernet adapters. One of the Fast Ethernet adapters acts as the front-end Internet access. This adapter is associated with a private unregistered address and allows transfer of HTTP and FTP protocol formatted data. This adapter preferably may not allow logging on into the server 100. The other adapter connects to a private management network. This adapter is used for data access and operational control.

Transfers to dedicated servers 100 are routed through a separate port on routers 110 and utilize a separate group of RND WSD Pro boxes 106. This segmentation provides an extra level of security by only allowing FTP requests to be sent to the dedicated server network.

Preferably, each dedicated server 100 runs two instances of Netscape Enterprise Server. One is used for production access from the Internet (only accessible from the front-end Fast Ethernet adapter) and the other is used as a staging site for pre-production work (only accessible from the back-end network).

The administrator for dedicated servers 100 accesses the back-end network via the back-end firewall 126. Back-end DNS 112 points to a staging site so the administrator may see their new site prior to moving the site into production. For the administrator to view the production site, access to the site is provided through the Internet. Since staging site and production site have the same domain name, the administrator accesses a specific back-end DNS 112 that points to the staging site.

Server and application configuration and log files are stored on Auspex NFS servers 120 within data center 102. If a dedicated server 100 fails, a spare dedicated server 100 is installed on the network and loaded using Jumpstart. Since the server 100 and application and log files are kept on the Auspex NFS servers 120, the spare dedicated server 100 assumes operation without having to manually reconfigure the application.

Preferably, shared servers 104 comprise Sun Ultra 2 devices (two 300 MHz, 512 M Ram, two 2 GB drives and two Fast Ethernet Adapters). In one embodiment, five shared servers 104 support 175 customer sites. Each shared server 104 supports 35 average customer sites, but more or fewer sites may be supported. With the load balancing capability of RND WSD Pro boxes 106, the request load is generally evenly distributed across the shared servers 104 in the shared pool. Since the two data centers 102 provide geographic site mirroring, the 175 customer sites are distributed across 10 shared servers, five in each data center 102.

Each shared server 104 has an IP or other address associated with the production side interface and 175 virtual IP addresses bound to it. Each customer web server software is bound to one of the virtual IP addresses.

In one embodiment, shared servers 104 are not accessible by the shared customer administrators. The shared customer administrators have access to a shared staging server 122. Due to memory usage, security and any affect on other customers, the shared customers have read access to a library of Computer Generated Interfaces (CGI). To conserve memory, each shared server 104 runs Netscape's Enterprise Server in software virtual server mode. This mode uses data from the CGIBIN and spawns server threads only when needed. Each server thread uses roughly 3 to 4M.

Alternatively, for CyberCash processing, shared customers run as a separate server instance. This allows customers to have a separate read-only CGIBIN.

If a shared server 104 fails, RND WSD Pro boxes 106 remove the server 104 from the available shared pool. The failed server 104 is then repaired and connected to the network. Using a Jumpstart server, the repaired shared server 104 is loaded. Since the configuration and log files are stored on the Auspex NFS servers 120, the system begins processing from where it left off without manual reconfiguration.

NFS Servers 120 preferably comprise Auspex NS7000 servers. NFS servers 120 may provide fault tolerance, high availability, survivability and scalability in a storage system. Each data center 102 includes a pair of NFS servers 120 for storing the production and staging site content, log files and local server 100, 104, 122, 112 configurations.

Figure 5:
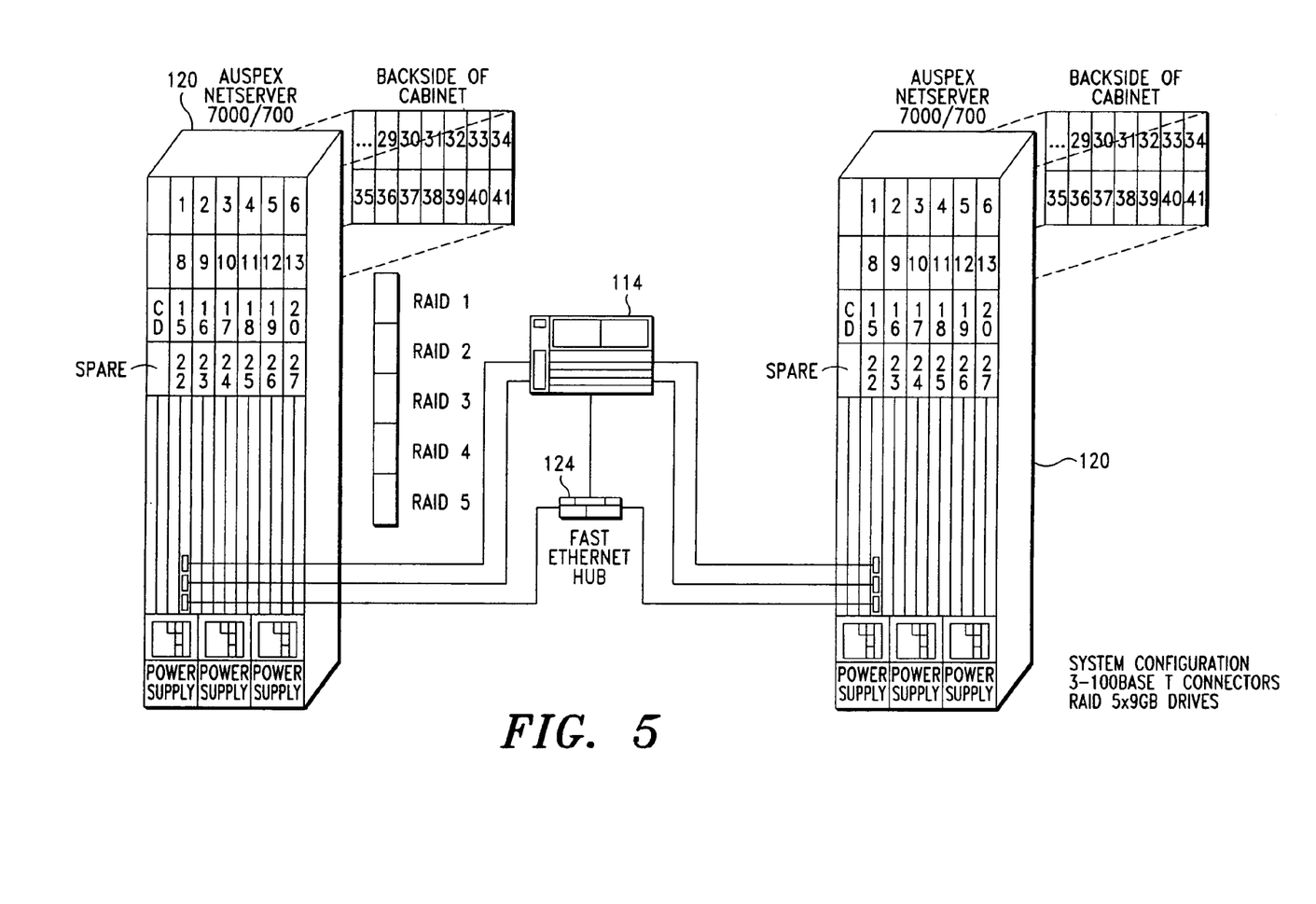
FIG. 5 is a block diagram representation of an embodiment of a data storage architecture in accordance with the present invention.

Referring to FIG. 5, one preferred embodiment of NFS servers 120, switch 114 and hub 124 are shown. Each NFS server 120 includes three Fast Ethernet interfaces with two connected to different interface cards within the Catalyst 5500 switch 114. The other Fast Ethernet interface preferably connects to a standalone Fast Ethernet hub 124 that is connected to the Catalyst 5500 switch 114. A system heart beat is transmitted on the interfaces connected to Catalyst 5500 switch 114 as well as the interface connected to Fast Ethernet hub 124. Ethernet hub 124 provides a means for NFS servers 120 to avoid both assuming master functions (avoids split brain). If the heartbeat only traversed across the Catalyst 5500 switch 114 and a management module in the switch 114 failed causing a 60-second outage, NFS servers 120 may not communicate, so both servers 120 may assume the master function. Once NFS servers 120 begin communicating after the failure, NFS servers 120 may not synchronize since each one is acting as the master. Standalone Fast Ethernet hub 124 allows the heartbeat to remain in session as switch 114 reinitializes.

NFS servers 120 have two modes of failover protection. The first stripes data across multiple drives. If one of the drives fail, the remaining drives continue to service requests for data that existed on the failed drive. The second mode comprise the method described above of having the two NFS servers 120 mirror each other with a heartbeat signal exchanged between them. The heartbeat may be transferred over multiple interfaces and may be configured for transmission every 5 or more milliseconds. If one of NFS servers 120 fail, the switch to the other NFS server 120 is substantially immediate. In the second mode, writes are multicast to both NFS servers 120 and reads are serviced by both NFS servers 120. Thus, the NFS servers 120 may process twice as many read requests due to the mirrored copy of the data.

Referring to FIG. 4, staging server 122 comprises Sun Ultra 2 servers (two 300 Mhz, 512 M Ram, two 2 GB drives and two Fast Ethernet Adapters). Staging server 122 provides a staging site for shared customers.

Preferably, staging server 122 supports about 75 customers. Shared customers review their staging site as processed by staging server 122 prior to publishing the site to the production server 104. With multiple companies' sites running on the shared pool of servers 104, non-production corporate information remains secure. Access to shared production servers 104 may not be directly provided to customers. Access to these servers 104 is provided for the back-end operational group. Other security processes may be used.

When a customer administrator accesses data center 102, firewall 126 allows the customer administrator to send information to their staging server IP address, access the administration site and receive information from back-end DNS 116. Firewall 126 prohibits them from hitting any other staging server sites or any other servers 100, 104, 112 on the back-end network.

Dedicated customer administrators access their production server IP address and the administrator site on the utility server 112. Direct access to their production server 100 allows them to develop and run their own CGIs. This administrator site on staging server 122 also links to the customers monitoring information. This information informs them how much disk space is used, how much transfer has been used, a number of hits, etc. This administrator site also has user guides for the CGI library and links to other sites for information about Java scripts, Java applets, etc.

To conserve memory and since a shared CGIBIN is used for shared customers, Netscape Enterprise Server is run in the software virtual servers mode. Alternatively, the shared staging servers 122 run Netscape Enterprise server as a separate instance, providing a separate CGIBIN for each customer. Staging server 122 mounts customer staging sites from NFS servers 120.

As an alternative to providing customer administrator access to staging servers 122 in both data centers 102, customer administrators are allowed access to one staging server 122, such as the San Jose staging server. Staging server information is backed-up in the San Jose data center in case of loss of the San Jose data center 102. If the San Jose data center 102 is down for an extended length of time, the DNS entry for the proxy firewalls on the back-end network changes to point to the firewalls in the other data center 102, such as the Relay data center and the staging back-ups are provided to the Relay data center 102.

CyberCash/DNS Servers 112 preferably comprise Sun Ultra 2 servers (300 Mhz, 256M Ram, two 2 GB drives and two Fast Ethernet Adapters). Preferably, two CyberCash/DNS servers 112 are provided at each data center 102. The CyberCash/DNS servers 112 process CyberCash/DNS requests. The two CyberCash/DNS servers 112 are load balanced by RND WSD Pro boxes 106. The back-end DNS 116 has one 10. address load balanced across the two virtual 10. addresses of the actual DNS application on the CyberCash/DNS servers 112. The CyberCash application is load balanced in the same manner as the DNS servers 112

(CyberCash and DNS functions are performed by the same servers 112). Each shared and dedicated server 100 and 104 uses one 10. address for CyberCash. If one of the CyberCash/DNS servers 112 goes down, RND WSD Pro boxes 106 route traffic to the surviving CyberCash/DNS server 112.

CyberCash requires communication with various financial institutions on the Internet. Therefore, requests from CyberCash servers 112 to the Internet are routed through the back-end interface and are proxied by the firewall 126.

Firewall server 126 preferably comprises a Sun Ultra 2 server (300 Mhz, 256M Ram, two 2 GB drives and two Fast Ethernet Adapters running Raptor Eagle Software). In one embodiment, two firewalls 126 are provide at each data center 102 and secure write access into their data center 102. Anyone that has access to data centers 102 passes through one of the two firewalls 126. Preferably, there are five connections to each firewall 126: one from an operations network, one from the back-end network, one from the Internet (proxy access from staging server 122 to verify links on the customers staging web sites), one from a private production network and one from a private back-end management network.

The operations network connected to firewalls 126 is an inbound only port. Firewalls 126 allow traffic and protocols to pass from the operations network into data center 102 but block traffic from data center 102 into the operations network.

The back-end network connection comprises an inbound only port. Customer administrators access the data center through this port. Firewall 126 acts as a proxy server to the customer administrators. Once the shared customer administrators successfully enter their user-id and password, firewall 126 allows them to access the IP address of their staging site and DNS servers 112 selected by firewall 126. If the DNS entry is not found in the back-end data center DNS 116, the request is proxied out of firewall 126 to a DNS in the Internet. Thus, the customer administrators access the Internet for reference information as well as to verify their links.

Dedicated customer administrators preferably use HTTP, FTP and Telnet to access their dedicated server 100 as well as the administrator site on the staging server 122. The shared customer administrators preferably use HTTP and FTP to access their staging site and the administrator site.

The Internet port is preferably for outbound traffic and firewall 126 proxies requests from data center 102 to the Internet through that port. The only inbound traffic is traffic initiated from within data center 102.

Half of the customer administrators proxy to one of the firewalls 126, and the other half proxy to the other firewall 126. Alternatively, one firewall 126 processes substantially all of the requests, and the other firewall 126 acts as a standby. If one of firewalls 126 fail, the other firewall 126 has the same configuration for processing requests associated with all the customer administrators.

Data centers 102 preferably include two Cisco 4700 Router 128 (64M DRAM, 4 port Serial, 6 port Ethernet). Cisco 4700 routers 128 process the back-end connections. Preferably, three DS1 lines from the back-end network from each data center connect to routers 128. Two DS1s connect to one of the 4700 routers 128 and the other DS1 connects to the other 4700 router 128 for failover.

As information associated with a customer site is developed, the information is archived. With two NFS servers 120 having mirrored data at each data center 102, there are 4 copies of the same data. Generally, the production data is not backed up or archived.

The data is backed up periodically, such as every night with a nightly rotation of partial full (full backup of part of the data) and incremental back ups. Due to the large amount of data, a seven day rotation for full back up of portions of the data is preferably used. Preferably, seven groups of file systems are identified and each group is fully backed up once a week on alternating nights. On any given night, the remaining groups are incrementally backed up.

Figure 6:
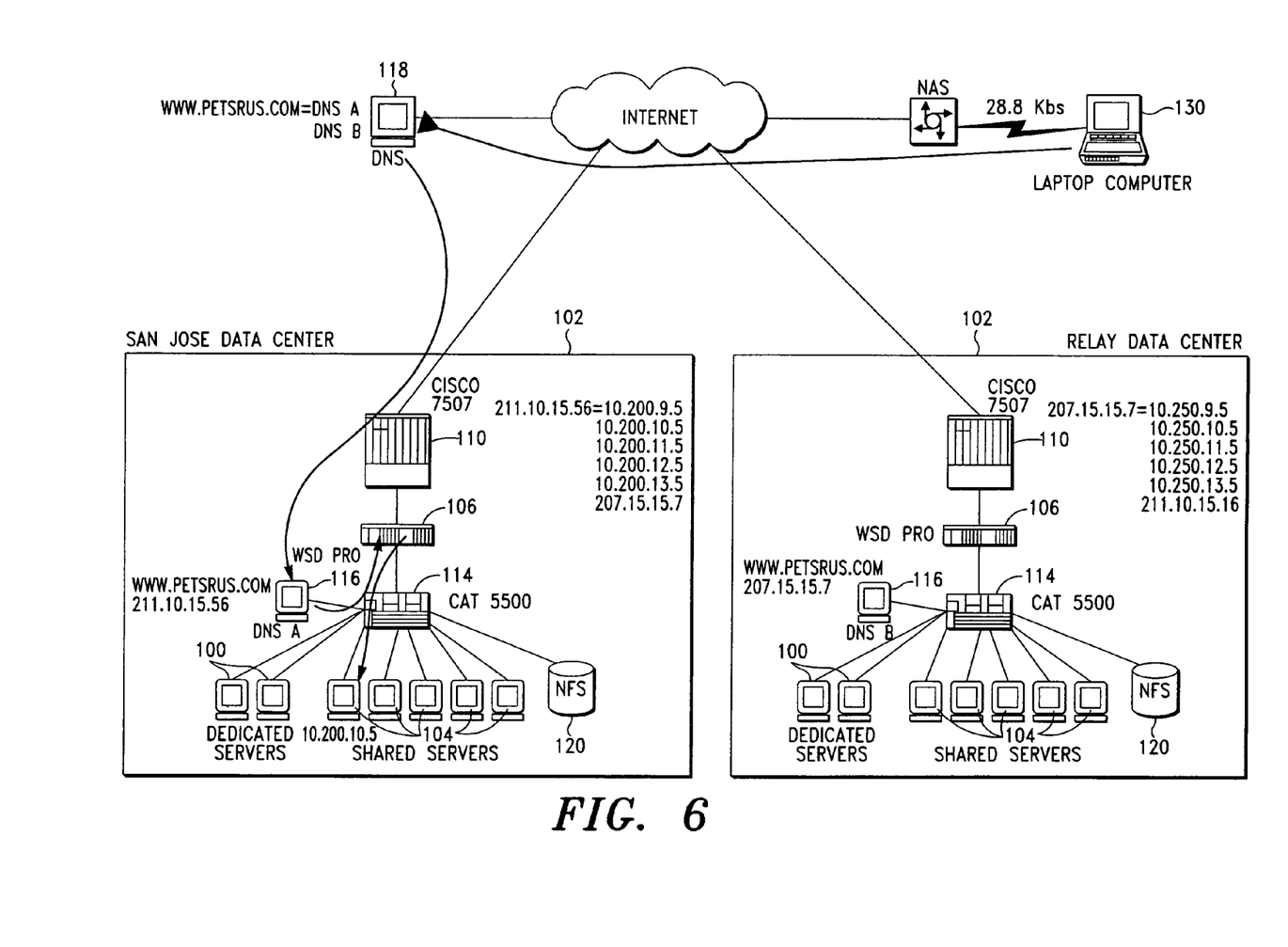
FIG. 6 is a schematic block diagram of an alternate embodiment of a processing and data storage architecture in accordance with the present invention.

Referring to FIG. 6, one embodiment of the present invention graphically showing the data flow that occurs when a site is requested. Generally, the same reference numbers as FIG. 4 are used where appropriate. For convenience, only certain components of data centers 102 are shown. Additional, fewer, or different components may be used.

A customer using computer 130 requests a particular domain name, such as www.petsrus.com. The DNS associated with the customer attempts to resolve www.petsrus.com. The request follows the normal DNS tree and finally identifies a DNS 118 that has two NS records for www.petrus.com, identifying DNS A 116 and DNS B 116 in the two data centers 102. The DNS 118 with the two NS records sends the request to the first DNS, in this case DNS A 116. If DNS A 116 is unable to respond, the request is sent to DNS B 116. Fail over for DNS requests is provided.

Assuming DNS A 116 responds, the corresponding data center 102 processes the request. DNS A 116 is inside RND WSD Pro box 106 and connected to switch 114. Thus, the main DNS 118 enters data center 102 on the subnet associated with data center 102, verifying that data center 102 is operational.

When DNS A 116 receives the request, the registered IP address of www.petsrus.com (i.e. 211.10.15.56) is returned to the requesting user. The users client then requests access to 211.10.15.56. This IP address corresponds to RND WSD Pro box 106 in the San Jose data center 102.

Once the request reaches RND WSD Pro box 106, RND box 106 checks the availability of the server pool corresponding to 211.10.15.56. Once RND box 106 selects the most available server 104, such as server 10.200.10.5, the request is routed to that server 104.

If all the appropriate local servers 104 or 100 are down or fully loaded, RND WSD Pro box 106 redirects the request the other data center 102, such as 207.15.15.7. This address corresponds to the registered IP address of this shared site at this other data center 102. When the request is received at RND box 106 in the Relay data center 102, RND box 106 checks the availability of the associated server pool. Once RND box 106 selects the most available server 104, the request is routed to that particular server 104.

Requests associated with dedicated servers are processed in a similar manner. Instead of identifying a most available server, the request is routed to the appropriate dedicated server 100. If dedicated server 100 is not operational, then the request is routed to the other data center 102.

It should be understood that many changes and modifications can be made to the embodiments described above. For example, different numbers of application processors or data storage devices may be used to provide different processing and data. It is therefore intended that the foregoing detailed description be understood as an illustration of the presently preferred embodiments of the invention, and not as a definition of the invention. It is only the following claims, including all equivalents, that are intended to define the scope of the invention.

We claim:

1. A scalable system for providing network processing and stored data access, the system comprising:
   (a) at least first and second servers operative to process at least first and second user requests, respectively;
   (b) a switch operatively connected to each of the servers;
   (c) a load balancer operatively connected to each of the at least first and second servers, the load balancer operative to route an additional user request to the one of the at least first and second servers with the least load;
   (d) a plurality of data storage devices operatively connected to the switch; and
   (e) wherein the servers operate independently of the data storage devices and are connected to the data storage devices via the switch in a manner to permit the inclusion of an additional server to process another additional user request without the inclusion of an additional data storage device.

2. A scalable system for providing network processing and stored data access, the system comprising:
   (a) at least first and second sets of servers, each of the sets of servers comprising at least first and second servers operative to process at least first and second user requests, respectively, and wherein each of the sets of servers applies a separate application;
   (b) a switch operatively connected to each of the servers within each of the sets of servers;
   (c) a plurality of data storage devices operatively connected to the switch;
   (d) wherein the sets of servers operate independently of the data storage devices and are connected to the data storage devices via the switch in a manner to permit the inclusion of an additional server to any of the sets of servers to process at least an additional user request without the inclusion of an additional data storage device; and
   (e) wherein each of the at least first and second servers of any one of the sets of servers applies an application, and wherein the system further comprises a load balancer operatively connected to each of the at least first and second servers of each of the sets of servers, the load balancer operative to route user requests to the one of the at least first and second servers of the sets of servers with the least load for a particular application.

3. A survivable system for providing network processing and stored data access, the system comprising:
   (a) at least first and second servers operative to process at least first and second user requests, respectively,
   (b) a switch operatively connected to each of the servers;
   (c) a plurality of data storage devices operatively connected to the switch;
   (d) wherein each of the first and second servers applies an application, the application applied by the first server being substantially the same as the application applied by the second server such that, in the event of a failure of either of the first and second servers, any subsequent user requests will be processed by any other of the servers that are operable; and
   (e) wherein each of the plurality of data storage devices stores data, the data stored by each of the plurality of data storage devices being substantially the same such that, in the event of a failure of any one of the plurality of data storage devices, the data is accessible from any other of the plurality of data storage devices that are operable.

4. The system of claim 3 wherein the data stored by any one of the plurality of data storage devices is associated with an application applied by any one of the first and second servers.

5. The system of claim 3 wherein each of the at least first and second servers applies an application selected from the group consisting of: a mail application, a news application, a directory application, a content application, a groupware application, and an internet protocol (IP) service.

6. The system of claim 3 further comprising a load balancer operatively connected to each of the at least first and second servers, the load balancer operative to route user requests to the one of the at least first and second servers corresponding to the server with the least load.

7. A method for providing network processing and stored data access, the method comprising the steps of:
   (a) providing at least first and second servers operative to apply first and second applications, respectively, the first application being substantially the same as the second application;
   (b) receiving first and second user requests on the first and second servers, respectively;
   (c) applying the first and second applications to the first and second user requests, respectively, to generate first and second queries, respectively;
   (d) providing at least first and second data storage devices configured to store first and second data, respectively, the first data being substantially the same as the second data;
   (e) switching the first and second queries to the first and second data storage devices, respectively;
   (f) routing first requested data from the first data storage device to the first server in response to the first query, and routing second requested data from the second data storage device to the second server in response to the second query;
   (g) in the event of a failure of either of the first and second servers, processing any subsequent requests on any other of the servers that are operable; and
   (h) in the event of a failure of either of the first and second data storage devices, providing any subsequent requested data from any other of the data storage devices that are operable.

8. The method of claim 7 wherein each of the first and second applications is selected from the group consisting of: a mail application, a news application, a directory application, a content application, a groupware application, and an internet protocol (IP) service.

* * * * *